(12) United States Patent
Smuk et al.

(10) Patent No.: US 6,697,966 B1
(45) Date of Patent: Feb. 24, 2004

(54) DATA BUS FOR A PLURALITY OF NODES

(75) Inventors: Karel Smuk, Schweitenkirchen (DE);
Robert Griessbach, Wayarn (DE);
Martin Peller, Munich (DE); Josef Berwanger, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/623,853
(22) PCT Filed: Feb. 23, 1999
(86) PCT No.: PCT/EP99/01164
§ 371 (c)(1),
(2), (4) Date: Nov. 8, 2000
(87) PCT Pub. No.: WO99/46893
PCT Pub. Date: Sep. 16, 1999

(30) Foreign Application Priority Data

Mar. 10, 1998 (DE) .......................................... 198 10 289

(51) Int. Cl.[7] ............................................... G06F 11/34
(52) U.S. Cl. ....................................................... 714/43
(58) Field of Search ............................... 714/43, 45, 56; 709/252, 253; 710/106

(56) References Cited

U.S. PATENT DOCUMENTS 4,494,185 A  *  1/1985  Gunderson et al. ......... 709/252

FOREIGN PATENT DOCUMENTS

DE           3613183 A1 * 10/1987  ............. H04L/1/24

OTHER PUBLICATIONS

Tominaga et al., "A Network Architecture With Distributed Switching Function For Optical Fiber Links", 1982, IEEE, pp. 478–483.*

* cited by examiner

Primary Examiner—Scott Baderman
(74) Attorney, Agent, or Firm—Crowell & Moring LLP

(57) ABSTRACT

A data bus for establishing a connection among a plurality of nodes and having configuration whereby optical data messages are converted to an electrical signal and sent through a logical decision gate to each of the nodes. A memory element, which is connected in parallel to the input of the logic decision gate, provides an addressable manner of monitoring data traffic on the data bus and identifying a source of any malfunction.

6 Claims, 1 Drawing Sheet

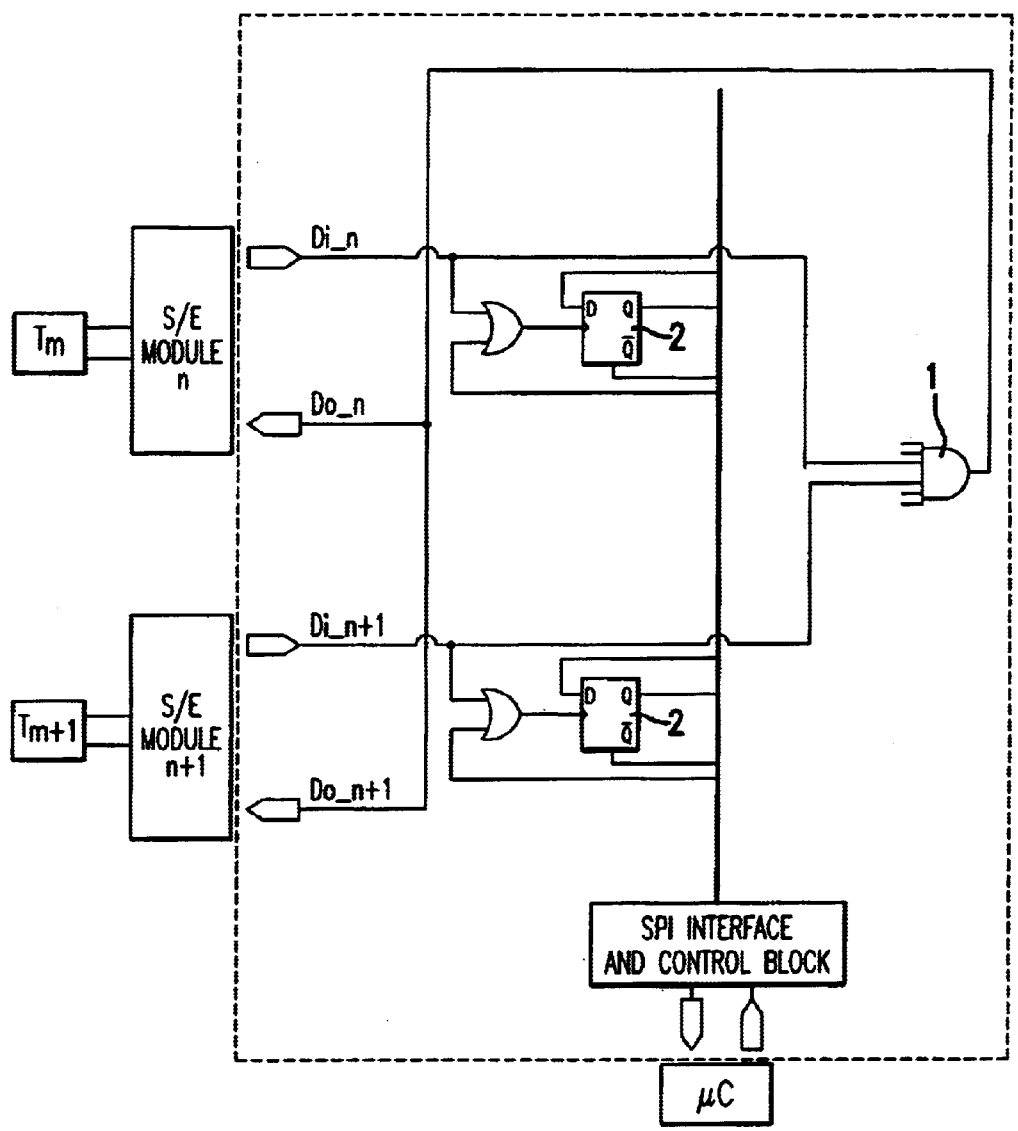

DATA BUS FOR A PLURALITY OF NODES

This application claims the priority of German Patent Application 198 10 289.5 filed Mar. 10, 1998 and PCT/EP99/01164, filed Feb. 23, 1999, the disclosures of which are expressly incorporated by reference herein.

BACKGROUND AND SUMMARY OF THE INVENTION

The invention relates to a data bus for a plurality of nodes, which are connected to one another via a star coupler. Such a data bus is known from the previously unpublished German patent application 19720401. The nodes are connected to the data bus via send/receive modules. Particularly if nodes sending optical data messages are connected to the data bus, there may be a malfunction of a bus node (e.g. continuous sending of messages) or an error in a send/receive module (e.g. output of an optical/electric transducer used in the send/receive module remaining on the low level that normally occurs only during signal traffic, even when there is no signal traffic) which blocks bus communication. In this case the error source cannot be determined automatically. Nor is it possible to intervene automatically. Bus communication remains down until repair.

The object of the invention is to create a data bus which makes it possible to monitor the data traffic on the data bus and, when a malfunction occurs, to identify the source.

The present invention provide a series of individual measures that in combination have the desired effect. On the one hand, any optical signals are converted into electrical form and are supplied to the star coupler as input signals in electrical form. The star coupler itself contains a logic decision gate to which the input signals are routed and the output of which is connected in parallel to the inputs of the nodes via an electrical line. A storage element is connected in parallel to each input of the decision gate and permanently changes its state when an input signal occurs at this input.

The addressability of the storage element makes it possible in a simple manner to detect which node(s) was/were involved in the bus traffic or at which input an error exists. For this purpose, the state of the storage element can be read out, for example, by a microcontroller assigned to the star coupler via a serial interface (e.g. PI). If a fault occurs during message transmission, the source of the fault can thus be determined.

Finally, the storage element can be reset after an error free transmission or after being read out by the microcontroller. Any subsequently occurring error can be detected and distinguished from the previous error.

Other objects, advantages and novel features of the present invention will become apparent from the following detailed description of the invention when considered in conjunction with the accompanying drawings.

BRIEF DESCRIPTION OF THE DRAWINGS

The single FIGURE detail a data bus according to the invention in which the send operation of the nodes is monitored.

DETAILED DESCRIPTION OF THE PREFERRED EMBODIMENTS

Two nodes $T_n$ and $T_{n+1}$ are connected via S/E (Send/Receive) modules $S/E_n$ and $S/E_{n+1}$. The $S/E_n$ and $S/E_{n+1}$ modules convert optical messages coming from the nodes $T_n$ and $T_{n+1}$ into electrical form and relay these signals $Di_n$, $Di_{n+1}$ as input signals to a logic decision gate (AND gate 1), which is a central component of a star coupler K. The number of the inputs and outputs of the AND gate 1 corresponds to the number of the bus nodes. The output of the AND gate drives all the inputs ($Do_n$, $Do_{n+1}$) of the $S/E_n$ and $S/E_{n+1}$ modules. These modules convert electrical signals into optical signals and transmit these optical signals to the nodes $T_n$ and $T_{n+1}$ via optical transmission segments.

A register cell 2, which detects a low level at the respective input, is assigned to each bus node input on the star coupler K. If the bus node connected to this input serves as a signal source (sender), or if a low level is permanently present, this state is stored and can be read out by a microcontroller uC via a serial interface (e.g. SPI). This makes it possible to detect which node(s) was/were involved in the bus traffic or at which input an error exists. If a fault occurs during transmission of a message, the source of the fault can thus be determined. After an error free transmission, the register is automatically reset.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus arrangement for a plurality of nodes configured to provide communication among each of said nodes, said data bus arrangement comprising:

a logic decision gate having a plurality of inputs which correspond to said plurality of nodes;

a plurality of optical transmission modules corresponding to said nodes wherein an output of each of said nodes is connected to an input of one of said modules and wherein an output of each said one module provides an electrical signal to a corresponding one of said inputs of said logic decision gate and wherein the output of said logic decision gate is connected in parallel to a respective second input of each of said optical transmission modules;

a plurality of storage elements wherein each of said storage elements is connected in parallel to one of said inputs of said logic decision gate and wherein a state of each of said storage element is permanently changed when an input to said storage element is received.

2. The arrangement according to claim 1, wherein said storage elements are addressable.

3. The arrangement according to claim 1, further including a microcontrollor for reading the state of said storage element.

4. The arrangement according to claim 1, wherein each of said storage elements are resettable.

5. A data bus structure for connecting a plurality of nodes to each other, said structure comprising:

a logic decision gate having a plurality of inputs corresponding to said plurality of nodes;

a plurality of signal converting means, each connected between one of said nodes and one of said inputs of said logic gate, wherein an output of each of said converter means provides an electrical signal as said input to said logic decision gate and wherein an output of said logic decision gate is connected to an input to each of said plurality of signal converting means;

addressable memory means connected in parallel to said output of said converter means for determining and locating a fault occurring during transmission of a message from one of said nodes to another one of said nodes.

6. A system according to claim 5, further including a means for resetting said addressable memory means.

* * * * *